United States Patent [19]
Jennings et al.

[11] 4,194,373
[45] Mar. 25, 1980

[54] SHOCK ISOLATION COUPLING

[75] Inventors: Frederick A. Jennings, Woodland Hills; Thomas C. Bowen, Westlake Village, both of Calif.

[73] Assignee: Sportscoach Corporation, Chatsworth, Calif.

[21] Appl. No.: 877,267

[22] Filed: Feb. 13, 1978

[51] Int. Cl.² ............................ F16D 3/14; F16D 3/64
[52] U.S. Cl. ............................................ 64/14; 64/13; 64/27 NM
[58] Field of Search ........................ 64/14, 13, 27 NM

[56] References Cited

U.S. PATENT DOCUMENTS

| | | | |
|---|---|---|---|
| 1,868,163 | 7/1932 | Evans | 64/27 NM |
| 2,123,307 | 7/1938 | Kattwinkel | 64/14 |
| 2,621,493 | 12/1952 | Croset | 64/14 |
| 2,764,003 | 9/1956 | Croset | 64/14 |
| 2,849,871 | 9/1958 | Moeller | 64/14 |
| 2,873,590 | 2/1959 | Croset | 64/14 |
| 3,257,825 | 6/1966 | Croset | 64/14 |
| 3,345,831 | 10/1967 | Boole | 64/14 |
| 3,427,827 | 2/1969 | Airheart | 64/27 NM |
| 3,940,947 | 3/1976 | Ahlen | 64/14 |

FOREIGN PATENT DOCUMENTS

| | | | |
|---|---|---|---|
| 188987 | 4/1956 | Fed. Rep. of Germany | 64/14 |
| 2319121 | 11/1974 | Fed. Rep. of Germany | 64/14 |
| 2532833 | 1/1977 | Fed. Rep. of Germany | 64/14 |
| 270325 | 12/1950 | Switzerland | 64/14 |
| 669724 | 4/1952 | United Kingdom | 64/14 |
| 760475 | 10/1956 | United Kingdom | 64/27 NM |

*Primary Examiner*—Charles J. Myhre
*Assistant Examiner*—R. C. Turner
*Attorney, Agent, or Firm*—Robert E. Geauque

[57] ABSTRACT

A shock isolation coupling located in a drive train between a transmission and the engine flywheel. The coupling includes a drive plate and a driven plate, the driven plate being centrally located within an opening provided within the drive plate. The driven plate is connected to a driven shaft which supplies input torque to the transmission. The driven plate includes a plurality of protuberances, each of which is located within a separate recess formed within the wall of the opening of the drive plate. In the space between the drive plate and the driven plate, there is located an elastomeric material. Openings are formed in the material to control deflection. Different deflection characteristics can be achieved on opposite sides of the protuberances. Breaks in between the elastomeric material are caused in selected areas to control shear stress in the movements between the drive plate and the driven plate.

3 Claims, 4 Drawing Figures

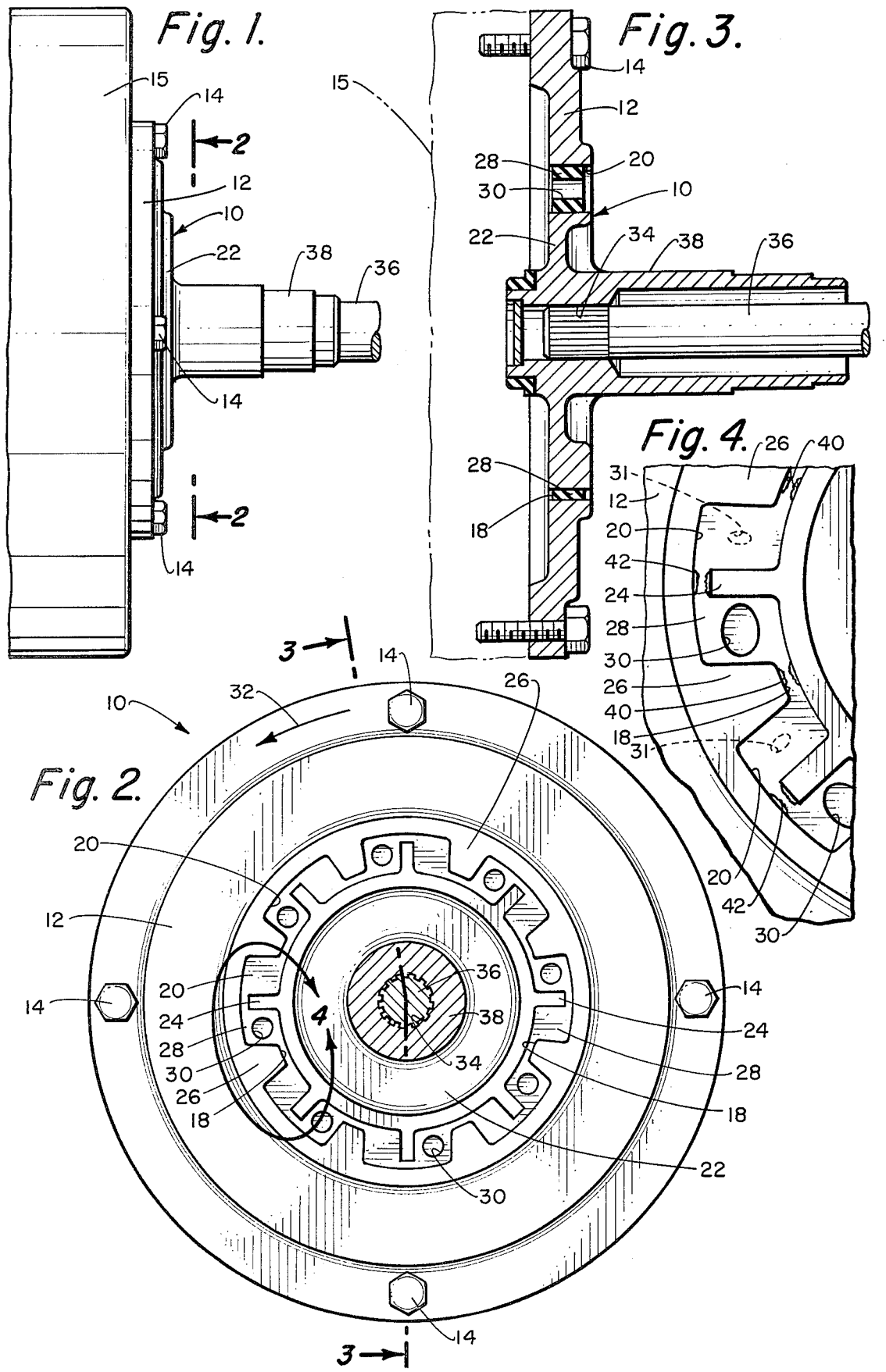

SHOCK ISOLATION COUPLING

BACKGROUND OF THE INVENTION

The field of this invention relates to shock isolating power transmitting couplings in which the engine power is supplied to the transmission input shaft through the use of the elastomeric material which is to minimize the transmitting of shock and vibration to the transmission.

At the present time, automotive engines are being mounted in boats without a torque converter attached between the engine and automatic transmission. The engine is directly connected to the automatic transmission and the automatic transmission then in turn, is directly connected to the propeller.

In the operation of any internal combustion engine, the power is not supplied at a continuous level. Each time ignition within the engine occurs, there is a power surge which then diminishes, and the next power surge and so forth. This uneven power level is made somewhat constant through the use of a flywheel. However, the effectiveness of a flywheel, particularly light weight flywheels, has not been sufficient to prevent shock and vibration being transmitted at undersirable levels through the automatic transmission. In normal operation of the boat, the automatic transmission will fail within a short period of time, since all automatic transmissions are designed to operate with a torque converter that absorbs shock. However, in a boat, the use of a torque converter causes energy losses. Therefore, it is undesireable to use such a torque converter.

There is a definite need for a device included within the drive train of a boat to substantially eliminate shock and vibration and prevent significant levels of such from being transmitted to the automatic transmission.

Although the structure of this coupling is designed or has been discussed primarily for use in boats, it is considered to be within the scope of this invention to employ the device in any engine environment.

SUMMARY OF THE INVENTION

The shock isolating coupling of this invention includes a drive plate which has a center opening formed therein. The drive plate is adapted to be rotated with the engine flywheel along a first rotational axis. The rotational axis of the drive plate is centrally disposed with respect to the opening. A plurality of identically shaped recesses or pockets are formed within the wall of the opening and are evenly spaced apart. A driven plate is to be centrally located within the opening and is to be rotated about a second rotational axis which coincides with the first rotational axis. The driven plate includes a plurality of protruding members. A single protruding member is to be located within each said recess. There is to be a space formed between the driven plate and the drive plate. This space is to be filled with an elastomeric material of a rubber or plastic composition. A portion of the elastomeric material on only one or both sides of each protruding member is to be removed. Breaks are created in selected areas within the elastomeric material to reduce shear stresses. Thus, the energy transmitting characteristics in the movement of the driven plate clockwise in respect to the drive plate is made significantly different than the energy transmitting characteristics of the movement of the driven plate in a counter-clockwise direction. In other words, in an engine drive train there is a high torque capacity in the drive direction and a low torque capacity in the drag (reverse) direction. However, the engine cannot reverse, therefore, low torque transmitting ability is adequate in the drag direction. The isolating coupling of this invention is for use principally in the drive direction. The elastomeric material is caused to operate mostly in compression, with tension and shear reduced or eliminated by the holes and breaks. The driven plate is to be connected to a driven shaft, through which power is to be supplied to the automatic transmission.

The primary objective of this invention is to provide the shock isolation coupling in which the energy transmitting characteristics are different in the rotational movement through the coupling in the clockwise and counter-clockwise direction. It has been found that this difference in energy isolation minimizes the transmission of shock and vibration through the automatic transmission.

BRIEF DESCRIPTION OF THE DRAWING

FIG. 1 is an elevational view of the shock absorbing coupling of this invention as it would be installed upon an engine flywheel and connected to the input power shaft of an automatic transmission;

FIG. 2 is a partly cross-sectional view of the coupling of this invention taken along line 2—2 of FIG. 1;

FIG. 3 is a cross-sectional view taken through line 3—3 of FIG. 2; and

FIG. 4 is an enlarged portion of FIG. 3 showing the pretorqueing of the coupling to break the shear areas to eliminate shear stress in its normal operation.

DETAILED DESCRIPTION OF THE SHOWN EMBODIMENT

Referring particularly to the drawings, there is shown in FIG. 1 the shock isolating coupling 10 of this invention which includes a thin, flat, circular-shaped drive plate 12 which is to be attached by bolts 14 to an engine flywheel 15. Centrally located within the drive plate 12 is an opening 18. The side wall of the opening 18 is formed to include a plurality of recesses or pockets 20. It is to be noted that the pockets 20 are evenly spaced apart with there being eight in number of pockets 20. Each pocket 20 is basically channel shaped, but the particular shape of each pocket 20 is deemed to be a matter of choice.

Located within the opening 18 is a driven plate 22. The driven plate 22 is formed to include a plurality of extending members 24 about the peripheral surface. The members 24 are evenly spaced apart and are eight in number.

The materials of construction of both the members 12 and the members 22 will normally be of a metal material such as steel or aluminum or alloy thereof.

A said extending member 24 is to be located within each recess or pocket 20. The outermost edge of the extending member 24 is spaced slightly from the inner wall surface of the pocket 20. There is also a space on either side of the extending member 24 and a slight space across each bridge 26 interconnecting each of the pockets 20. This space is to be entirely filled with an elastomeric material 28. The elastomeric material will normally be comprised of a rubber or plastic composition. A preferable type of material would be a urethane rubber which is commercially sold under the name "Adiprene" by E. I. duPont, de Nemours and Company of Wilmington, DE. "Adiprene" is a liquid urethane polymer which can be cured to a strong, rubbery solid which vulcanizes in the 60 to 90 hardness range (durometer A). "Adiprene" has a high compressive strength and resilience and an excellent resistance to compression set. Although "Adiprene" is most satisfactory, there may be other types of elastomeric materials used.

The elastomeric material 28 is to be poured into the space when the plates 12 and 22 are correctly positioned on a mold. When the entire space is taken up by the elastomeric material 28, the material 28 is permitted to harden. Aperture 30 is formed within the mold, always on the same side of each member 24. There may be an aperture 31 formed within the elastomeric material on the opposite side of member 24. The size and/or location will probably be different than aperture 30 so as to present an unsymmetrical relationship so as to create different deflection characteristics within the elastomeric materal on opposite sides of the member 24.

The torque is to be transmitted through the coupling 10 in the direction represented by arrow 32 in FIG. 2. During operation of the coupling, the driven plate 22 will be pushed against the compression portion of the elastomeric material located within each pocket 20.

Typical maximum deflection would be three or four degrees angular displacement between the driven plate 22 and the drive plate 12 from the at rest position. During normal operation, the torque from the engine flywheel 16 will be transmitted through the drive plate 12, through the compression portion of the elastomeric material located in each pocket 20, and hence to the driven plate 22. This torque is then transferred directly through the spline connection 34 located within the drive plate 22 to a driven shaft 36. The driven shaft is located within a tube 38 which fits the automatic transmission (not shown).

During the normal small power surges in the transmission and torque from the drive plate 12 to the driven plate 22, the compression portion of the elastomeric material located within each pocket 20 will be rapidly compressed in various amounts of compression several thousand times per minute. When the torque load drops from the maximum, the driven plate 22 will move toward the portion of each pocket 20 which includes the aperture 30. The elastomeric material left in this portion of pocket 20 is in tension and will vary in tension in the same manner as the compression side of pocket 20. It is to be remembered that the elastomeric material is in constant contact with each extending member 24.

On one side of the member 24, the elastomeric material is shown solid and on the other side of the member 24 is the portion of the elastomeric material which includes the aperture 30. It is a primary interest to isolate as much as possible the vibration and shock loads in the transmitting of the torque from the drive plate 12 to the driven plate 22. By the including of the aperture 30 within each pocket of elastomeric material, the isolation characteristics of that portion of the material is different from the solid portion of the material shown in the pockets 20. As a result, a substantial amount of the undesirable vibrational torque has been eliminated.

After the elastomeric material 28 has been cured, any movement between the drive plate 12 and the driven plate 22 is subjected to compression stress, tension stress and shear stress. It is best to reduce the shear and tension forces and to depend mainly on compression to transmit torque.

The coupling of this invention is designed to be employed in a wide range of operating torque situations. In other words, the coupling is to be of primary advantage with larger sized boat engines as well as smaller sized boat engines. If the coupling operated not only a tension and in compression but also in shear, the coupling would function far differently (stiffer) than if the coupling operated only in compression and tension. In a larger sized engine, the torque level is great enough to cause the elastomeric material 28 to physically break between the drive plate 12 and the driven plate 22 where they are close to each other. This break of the elastomeric material 28 eliminates shear stress. In a smaller sized engine, the torque level may not be great enough to break the elastomeric material 28. This would mean that the coupling might not function as well with a smaller sized boat engine because of the introduction of shear stress within the coupling.

To avoid the different operating characteristics between larger and smaller sized engines, the coupling 10 of this invention is pretorqued after curing of the elastomeric material 28 to produce breaks 40 and 42 within the elastomeric material 28. In the area of each pocket 20 the drive plate 12 is merely rotated sufficiently in the counter-clockwise position with respect to the driven plate 22, reference being to FIG. 2, sufficiently to cause breaks 40 and 42 to occur. The breaks 40 and 42 are shown within FIG. 4. Break 42 is at the tip of each protuberance 24 and/or the wall of each pocket 20. Break 40 occurs at the tip of each bridge 26 and/or the surface of the driven plate 22. Both of these areas is where the thickness is the least of the elastomeric material 28. As a result, shear stress between the drive plate 12 and the driven plate 22 is eliminated and the movements between the drive plate 12 and the driven plate 22 are only in tension and compression.

Therefore, what is claimed is:

1. A shock isolating coupling for use in a drive train, said coupling comprising:
   a drive plate adapted to be driven by an engine, said drive plate having a centrally located opening therein, said drive plate adpated to rotate about a first axis, said first axis passing through the center of said opening;
   a driven plate located within said opening the peripheral edge of which is spaced from the wall of said opening forming a space therebetween, said driven plate adapted to rotate about a second axis which coincides with said first axis, protuberance means extending from the peripheral edge of said driven plate; and
   an elastomeric material having been poured within said space completely filling said space and surrounding said protuberance means but forming therein precisely located gaps, said elastomeric material having different deflection characteristics on each side of said protuberance means due to the formation and location of said gaps.

2. A shock isolating coupling said defined in claim 1 wherein:
   said different deflection characteristics within said elastomeric material being achieved by location of said gaps on both sides of said protuberance means in an unsymmetrical pattern.

3. A shock isolating coupling as defined in claim 2 wherein:
   one of said gaps being located directly adjacent the tip of said protuberance means.

* * * * *